Figure 1:
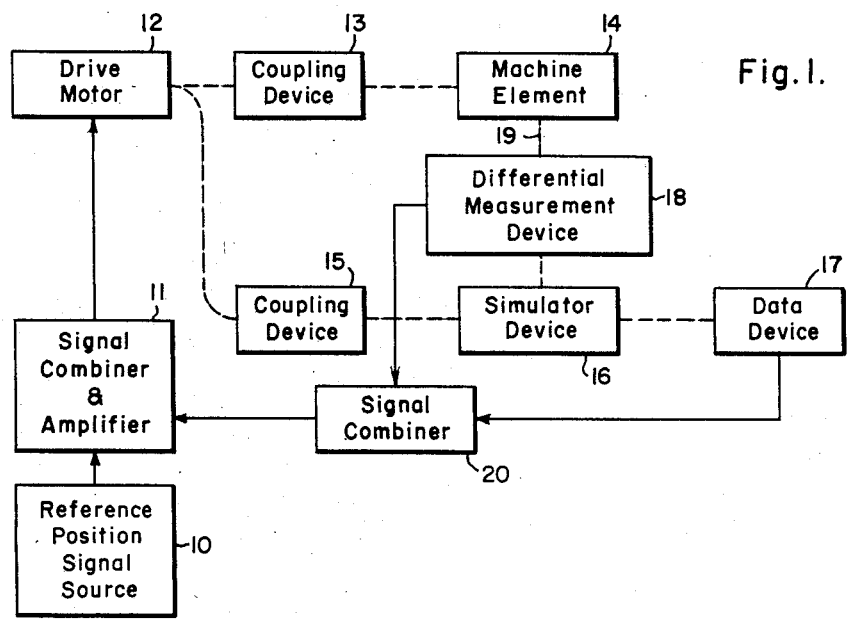

Nov. 17, 1959     F. BROUWER     2,913,648
POSITION CONTROL SERVOSYSTEM
Filed Sept. 17, 1958     3 Sheets-Sheet 1

WITNESSES

INVENTOR
Frans Brouwer
BY
ATTORNEY

Nov. 17, 1959      F. BROUWER      2,913,648
POSITION CONTROL SERVOSYSTEM

Filed Sept. 17, 1958      3 Sheets-Sheet 2

Nov. 17, 1959  F. BROUWER  2,913,648
POSITION CONTROL SERVOSYSTEM
Filed Sept. 17, 1958  3 Sheets-Sheet 3

United States Patent Office 2,913,648
Patented Nov. 17, 1959

2,913,648

POSITION CONTROL SERVOSYSTEM

Frans Brouwer, Ancaster, Ontario, Canada, assignor to Canadian Westinghouse Company, Limited, Hamilton, Ontario, Canada Application September 17, 1958, Serial No. 761,625

8 Claims. (Cl. 318—28)

This invention relates to mechanical positioning systems for machine tools and the like and in particular to means for the improvement of accuracy in such mechanical positioning systems.

In many such positioning systems it is required that a movable element be mechanically positioned in a particular point in response to a specific signal. This is true for example in machine tool control systems in which elements of a machine tool must assume certain positions in response to signals derived from punch card, tape or magnetic tape records. In such systems it is usual to supply the signal derived from the record in the form of an electrical signal to a power drive after suitable amplification, the drive usually being included in a servo system which causes the drive to assume a position dependent upon the signal. The movable machine element is coupled to the drive and the position of the element measured electrically. The output from the electrical measuring device is then compared to the control signal. If the control signal and the measuring signal have the same position versus signal characteristic and the two are compared the resultant is an error signal which indicates the amount by which the drive has failed to move the machine element to its proper position. This error signal may then be reintroduced into the system to cause a correction. This is a basic description of a form of servo system.

There are circumstances, however, where it is inconvenient to measure the position of the machine element. In such cases it may be possible to measure the drive position but then only the control signal and the drive are included in the servo loop. It will be seen that any error which exists in the coupling between the drive and the machine element will introduce an error into the positioning of the machine element. This problem is particularly evident in the situation where the drive produces a rotational output and the machine element must be positioned linearly. In this case, it is necessary to measure the linear position of a machine element. While short linear displacements may be measured conveniently, long linear displacements introduce problems since extended electromechanical linear transducers of simple and economical form are rarely available. One such transducer is, however, shown in copending patent application S.N. 628,285, filed December 14, 1956 by F. Brouwer and entitled Electromechanical Transducer and System, and will satisfactorily perform this function. Unfortunately this transducer used in the normal manner in certain applications is inherently ambiguous and requires a further transducer to be used in conjunction with it. It may also require a separate servo mechanism to drive the transducer. As a result systems using this or any other linear position sensing device are expensive and may introduce undesirable time delays.

It is therefore an object of this invention to provide a servo system which permits the measurement of the position of a machine element in such a way as to include all errors in position without requiring an absolute measurement of the position of the machine element.

It is a further object of this invention to provide a mechanical positioning system of improved accuracy and simple construction.

A further object of this invention is to provide an extended linear measuring system of improved accuracy and simple construction which may eliminate the ambiguity of previous systems.

Generally these objects are obtained by producing a simulation of the position of the machine element, the simulation being the result of a simulator which is coupled to the drive unit, measuring the relative position of the simulation and the machine element, measuring the position of the simulation, adding the actual position of the simulation to the relative position of the simulation and the machine element, and comparing the resultant signal to the command signal. In this regard it will be understood by the term simulator, a device which is capable of producing, when coupled to a mechanical drive, a determined point in space which moves through space relative to a fixed reference point along a path similar to the path of the machine element and parallel thereto, and further which with a given mechanical output from the drive unit will produce essentially the same absolute movement of the simulation as the machine element. The accuracy of the system then depends upon the accuracy of the relationship between the position of the simulation and the measurement of the position of the simulation.

Figure 2:
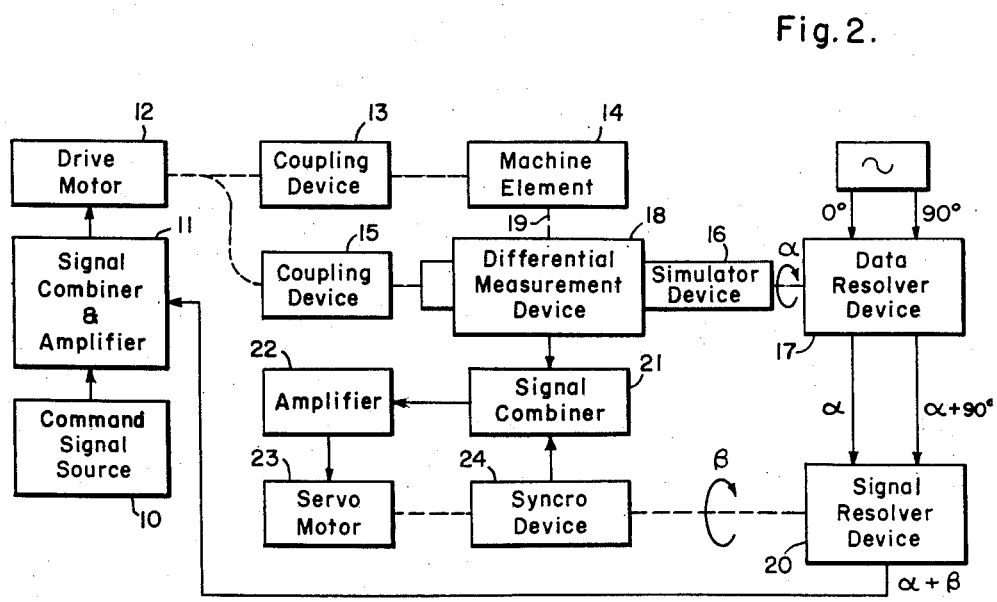
Figure 3:
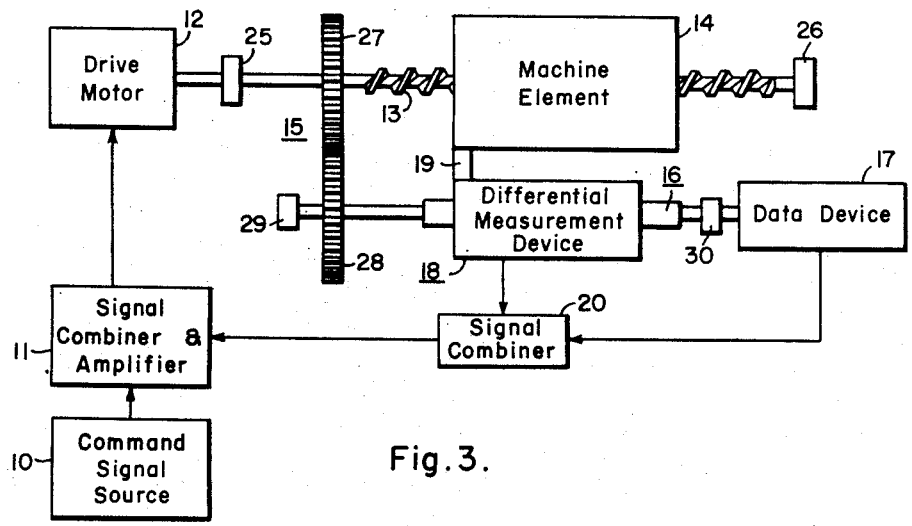
Figure 4:
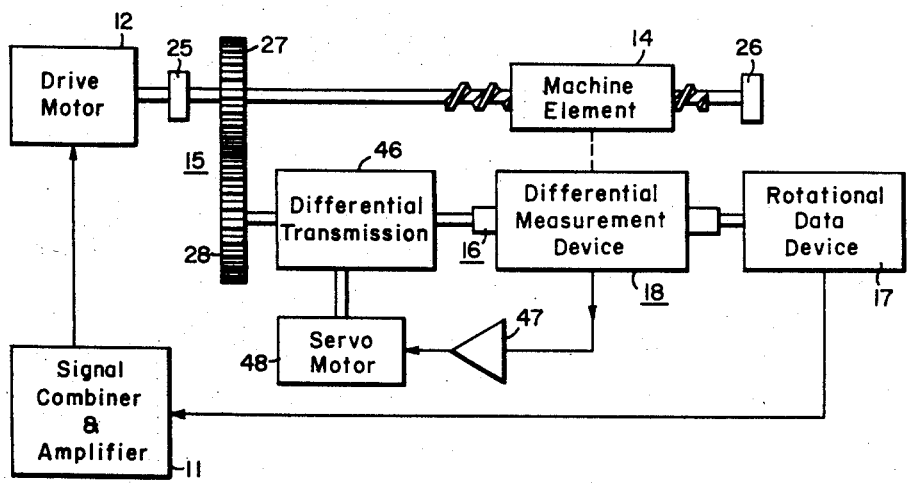
Figure 5:
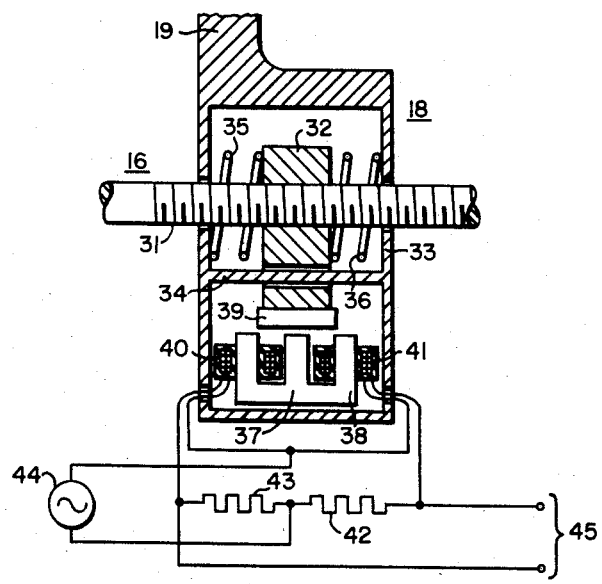

A clearer understanding of my invention may be had from the following specification and drawings in which, Figure 1 is a block diagram of a system incorporating my invention, Figure 2 is a modification of the system of Figure 1 showing only the essential portions thereof, Figure 3 is a specific embodiment of my invention, Figure 4 is an enlarged view of a specific form of a portion of Figure 3, Figure 5 is a further alternative form of the system being related to Figure 3 and showing only the portions which differ therefrom.

Considering first Figure 1, there is shown a command unit or reference position signal source 10 which produces a signal proportional to the desired position of the machine element. This signal may be derived as has been mentioned from punch cards, magnetic tapes, and the like, as is well known. The signal from the command is fed to signal combiner 11, and from there to its drive motor 12. The drive motor 12 is connected to the machine element 14 through the coupling 13. A further coupling 15 mechanically connects the simulator 16 to the drive motor 12. It will be assumed that the machine element 14 is to be moved and positioned an absolute distance from a reference point which may be taken for example as a specific point on the bed of the machine tool of which the machine element 14 is a part. Data device 17 measures the absolute position of the simulator relative to this same reference point. The differential measurement device 18 is directly coupled to the machine element 14 through a mechanical coupling 19. The output signals from data device 17 and differential measurement device 18 are combined in signal combiner 20 and applied to the signal combiner 11.

At this point it should be understood that the signal from the command unit 10 and from the differential measurement device 18 and from the data device 17 must all be of the same nature, that is, for example, if the command signal represents a position of the element 14 in terms of voltage versus linear inches of displacement from the reference point, then similarly the differential measurement device 18 and the data device 17 must produce signals in terms of voltage relative to the same linear displacement. It is also necessary that the specific ratio of voltage to linear displacement of the differential measurement device 18 and the data device 17 should be the same, that is, if the differential device produces an output of one volt per tenth of an inch, then the date device must similarly produce an output of one volt per tenth of an inch. Alternatively all the information may be digitally expressed, for example, as a digital code value for each discrete position and incremental variation.

Let us now assume that the command source 10 produces a command signal $C_1$ which when applied through the amplifier portion of the signal combiner and amplifier 11 to the drive motor 12 is supposed, according to the characteristic of the system, to produce a motion of the machine element 14 of distance D. However, due to errors in the coupling device 13 the actual motion of the machine element 14 is $D+E$, where E is the error in coupling device 13. At the same time the drive causes a motion of the simulator 16 of $D+E_1$, where $E_1$ is the error in coupling device 15. Date element 17 measures the position of the simulator 16 and converts it to a signal $C_2$ of the same nature as the command signal $C_1$ and this former signal $C_2$ must consist of $C_1+E_1$. The position of the machine element is $D+E$, the position of the simulation is $D+E_1$, the differential position of the simulation and machine element is therefore $E-E_1$. The two signals therefore combined in signal combiner 20 will result in a signal $C_1+E$, assuming the proper polarity of the two signals. The combination in signal combiner 11 of $C_1+E$ with $C_1$ will result in a further signal applied to the drive motor 12 of E, also assuming the proper polarity of the input signals.

The above described operation is as follows:

$C_1$ = command signal from source 10
$D$ = desired motion of machine element 14
$D+E$ = actual motion of machine element 14
$D+E_1$ = actual motion of simulator 16
$C_2 = C_1+E_1$ = output signal of data device 17
$D+E-(D+E_1)$ = output of differential device 18
$\quad = D+E-D-E_1$
$\quad = E-E_1$
$C_1+E_1+(E-E_1)$ = output of signal combiner 20
$\quad = C_1+E$
$C_1-(C_1+E) = -E$ = output of signal combiner portion of signal combiner and amplifier 11

The motion of the drive motor 12 will therefore continue until the error signal E disappears. With proper phasing throughout it will therefore be seen that machine element 14 is positioned accurately in accordance with command signal $C_1$ without ever having actually measured the absolute position of machine element 14.

In Figure 2 it is assumed that drive motor 12 produces a rotational output which through coupling 13 is converted into a linear motion of element 14. Similarly through coupling 15 this rotational motion is applied to the simulator 16. The simulator in this case consists of one winding of an electrical transducer as described in the above referenced patent application. This transducer is of such form that rotation of simulator 16 portion of the transducer causes the translation of a simulation, in the form of a signal null, along the length of the transducer. That is, for every rotational position of the simulator portion 16 there is at least one specific point where the differential measuring device portion 18 of the transducer produces a zero output. On either side of this simulation or null point the differential measuring device 18 produces an electrical output which increases with displacement until it reaches a maximum whereupon it then decreases to the next null point. If now the transducer is so designed that the translation of the simulation or null point for one rotation is essentially equal to the translation of the machine element for the same rotation of the drive, then the output from the differential measuring device will be a signal whose amplitude represents relative position of the simulation or null point and the machine element, always assuming that with the machine element at the reference position there was no output from the differential measurement device.

As a matter of convenience, the data device 17 in this case has been shown as a resolver with an alternating current input of zero and 90° and a shaft position of $\alpha$ degrees, dependent upon the position of the simulator 16, and therefore the output from the resolver is alternating current output signals of $\alpha$ phase and $\alpha+90°$ phase. These two output signals are applied to signal combiner 20 which is again a resolver. The output from the differential measuring device 18 is applied to combiner 21 and from there through amplifier 22 to servo motor 23. The shaft of servo motor 23 is coupled to the shaft of synchro 24 which in turn is coupled to the shaft of resolver 20. The servo motor 23, synchro 24 and combiner 21 and amplifier 22 together form a servo loop which produces an output in the form of mechanical position designated as angle $\beta$, this angle $\beta$ is an expression of the displacement of differential measuring device relative to the simulation or null point in terms of the equivalent angular rotation of the simulator 16. That is, if a fractional rotation of the simulator 16 produces a given displacement of the simulation or null point the resultant signal causes the servo loop to produce a given angular output $\beta$ equal to the same fraction of 360°. Therefore, the output from resolver 20 is the sum of the signals from data device 17 which is now a resolver and differential measuring device 18 which has also been converted to an angular value. In utilizing this type of system, it is necessary of course that the command signal also be expressed in angular value thus when the signal from resolver 20 is applied to signal combiner 11 the proper result is obtained and again drive motor 12 continues to rotate until machine element 14 is properly positioned with a minimum error.

As has previously been indicated, the form of signals used in the system may vary, indeed due to the form of transducer or the nature of the basic servo loop the characteristic signals may be different in different portions of the system but it is necessary that they be reduced to a common form before combining. The immediately foregoing system is only one example of such a situation where a servo combiner is used because the signals are in the form of phase signals or expressions of angular shaft positions.

Figure 3 illustrates a more specific embodiment of the invention in which, as before, similar designations are used for similar parts. Here, however, it will be seen that the coupling device 13 actually consists of a screw feed which is a transverse feed for a machine tool table still designated as machine element 14. This screw feed 13 is supported in bearings 25 and 26. Coupling device 15 now comprises a set of gears 27 and 28 which rotationally drive simulator 16 which is also mounted in bearings 29 and 30. Otherwise, the system is the same as the systems illustrated and described relative to Figs. 1 and 2. Signal combiner 20 can be of the same form as the signal combiner including the resolver shown in Figure 2.

Turning however to Figure 4, there is shown a specific form of a suitable differential measuring device 18 which may be used with the apparatus of Figure 3. The simulator 16 comprises simply a precision screw threaded shaft 31 which is mounted in backlash free bearings 29 and 30 and a precision fitted backlash free nut 32 which is mounted on the screw threaded shaft 31. The shaft 31 passes through a casing 33 which is rigidly connected to bridge 19. The nut 32 is retained within the casing and resiliently mounted to permit its longitudinal motion within the casing by means of springs 35 and 36. It is prevented from rotation by means of shaft 34 which passes through a hole in nut 32, this shaft suitably engages the nut though as to completely prohibit any rotational motion and yet freely permit longitudinal motion relative to the casing 33. Mounted in the lower portion of the casing 33 is a differential transformer 37 comprising an E-shaped core 38 and a movable armature 39 which is mounted for movement by nut 32, the core 38 being rigidly fastened to the casing 33. Mounted on the outer legs of the core 38 are two windings 40 and 41. These two windings together with impedances 42 and 43 comprise a bridge network which is supplied with an alternating current from generator 44. The differential transformer is so designed as to produce the required characteristic output signal, for example a linear displacement of armature 39 may produce a linear change in the output signal on terminals 45.

Let us now consider the operation of the system shown in Figure 3 when the device 18 is as shown in Figure 4. Let us assume that the feed screw thread 13 has a pitch of one tenth of an inch. Let us assume that the drive motor 12 has received a command signal indicating that the motion of the machine element 14 must be one inch. The drive motor 12 will then rotate 10 times causing the feed screw 13 to rotate 10 times and causing a translation of element 14 one inch approximately. However, any errors in feed screw 13 will cause a false displacement of machine element 14. Let us assume that this error is one-one hundredth of an inch and that actually machine element 14 has been displaced from its reference point one and one-one hundredths (1.01) of an inch. Let us now assume that the screw thread shaft 31 is a precision thread having a pitch of one tenth of an inch. Let us assume there is some backlash in the gearing 15. Ten turns of drive motor 12 will cause a translation of the nut 32 exactly one inch, assuming there is no error in gears 15. However, the backlash error may be assumed to have caused displacement of the simulator one tenth of a turn. This is equivalent to one-one hundredth of an inch but as a result the nut 32 has now been displaced one inch less one-one hundredth of an inch. Therefore, the body or core 38 of the differential transformer 37 has been moved one inch plus one-one hundredth of an inch, while the armature 39 connected to nut 32 has been moved one inch less one-one-hundredth of an inch. Therefore, the total displacement of the armature 39 relative to the core 38 is two one-hundredths of an inch. Let us now assume that the command signal is a signal of one volt per inch. The data device 17 must be some device such as a multiturn precision potentiometer which is capable of producing an output of one volt per ten turns. Therefore, the output from the data device 17 will be one volt less one-one hundredth of a volt. The output of the bridge circuit including the resistors 42 and 43 must similarly produce through a suitable circuit from terminals 45 a voltage proportional to one volt per inch displacement. If this is so arranged, then the output from the differential measuring device 18 will be a signal of two one-hundredths of a volt. The output from the signal combiner 20 will be one-volt plus one-one hundredth of a volt. The output from combiner 11 will be minus one-one hundredth of a volt. Drive motor 12 will therefore rotate in a reverse direction one tenth of a rotation which will cause machine element 14 to move in the reverse direction one-one hundredth of an inch which exactly corrects for the error inherent in the coupling device.

The above described operation relative to Figure 3 is as follows:

$C_{10} = C_1 = 1.00$ volt (output signal of source 10)
$D = 1.00$ inch (desired movement of element 14)
$E = +0.01$ inch (assumed error of element 14)
$D + E = 1.00 + 0.01$ (actual position of element 14)
  $= 1.01$ inch
$E_1 = 0.01$ inch (assumed error of simulator 16)

$D + E_1 = 1.00 + (-0.01)$ (actual position of simulator 16)
  $= 0.99$ inch
$C_{17} = C_2 = C_1 + E_1 = 1.00 + (-0.01)$ (output of device 17)
  $= 0.99$ volt
$C_{18} = E - E_1 = 0.01 - (-0.01)$ (output of device 18)
  $= 0.02$ volt
$C_{20} = C_{18} + C_{17} = 0.02 + 0.99 = 1.01$ volts (output of combiner 20)
$C_{11} = C_{10} - C_{20} = 1.00 - 1.01 = -0.01$ volt (output of combiner 11)

Figure 5 is a further modification of the system with particular reference to the system of Figure 3 and wherein the differential measuring device and the simulator may be as shown in Figure 4 or may be as referred to with reference to Figure 2. Here again similar elements bear similar reference numerals. Here, however, between the simulator 16 and the coupling 15 there is introduced a differential transmission 46. The output from the differential measurement device 18 is applied to an amplifier 47 and from there to a servo motor 48. As long as there is an output from the differential measuring device there is an output from amplifier 47 applied to servo motor 48. This output if properly applied causes servo motor 48 to rotate and drive differential 46 in a proper direction to reduce the output from the differential measuring device. Ultimately the simulator is driven until the difference output signal from the differential measuring device 18 is zero. In this case the difference signal is used to move the simulation or null point until such time as the simulation point exactly corresponds in position to the machine element position. Then by means of the rotational data device 17 the position of the simulation point is measured but at this time the position of the simulation point exactly corresponds to the position of the machine element. The output signal from the rotational data device 17 may therefore now be applied directly to the signal combiner 11. The output from this signal combiner 11 will therefore only include the signal error which represents the error of position of the machine element 14.

While my system has only been described in conjunction with two preferential types of specific simulators, it will be recognized that many variations may be produced by one skilled in the art and it is not of any particular importance what particular form of simulator or differential measuring device or data device is used so long as the requirements set forth in the earlier portion of the specification are met.

I claim as my invention:

1. In machine control apparatus for a machine element to be positionally controlled, the combination of a drive mechanism coupled to said machine element to position said element, a simulator device coupled to said drive mechanism for producing a simulation of the position of said element, first signal means operatively connected to measure the position of said simulation and produce a first control signal proportional to said simulation position, second signal means operatively connected to measure the relative position of said simulation and said element position and to produce a second control signal proportional to said relative position, and a signal combiner device operative to combine said first and second control signals and to produce thereby a third control signal proportional to the position of said machine element.

2. In machine control apparatus for a machine element to be positionally controlled, the combination of a drive mechanism coupled to said machine element to position said element, a simulator device coupled to said drive mechanism for producing a simulation of the position of said element, first signal means operatively connected to measure the position of said simulation and produce a first control signal proportional to said simulation position, second signal means operatively connected to measure the relative position of said simulation and said element position and to produce a second control signal proportional to said relative position, and a signal combiner device operative to combine said first and second control signals and to produce thereby a third control signal proportional to the position of said machine element, said simulator device having a rotatable shaft with said first and second control signals being in the form of phase angle displacements of a standard signal and representative of the rotational position of said shaft.

3. In machine control apparatus for a machine element to be positionally controlled, the combination of a drive mechanism coupled to said machine element to position said element, a simulator device coupled to said drive mechanism for producing a simulation of the position of said element, first signal means operatively connected to measure the position of said simulation and produce a first control signal proportional to said simulation position, second signal means operatively connected to measure the relative position of said simulation and said element position and to produce a second control signal proportional to said relative position, and a signal combiner device operative to combine said first and second control signals and to produce thereby a third control signal proportional to the position of said machine element with said simulator device including a precision threaded screw and engaging nut.

4. In machine control apparatus for a machine element to be positionally controlled, the combination of a drive mechanism coupled to said machine element to position said element, a simulator device coupled to said drive mechanism for producing a simulation of the position of said element, first signal means operatively connected to measure the position of said simulation and produce a first control signal proportional to said simulation position, second signal means operatively connected to measure the relative position of said simulation and said element position and to produce a second control signal proportional to said relative position, and a signal combiner device operative to combine said first and second control signals and to produce thereby a third control signal proportional to the position of said machine element with said second control signal being reduced to substantially zero by a modification of said simulation position before said first and second control signals are combined.

5. In machine control apparatus for a machine element to be positionally controlled, the combination of a drive mechanism coupled to said machine element to position said element, a simulator device coupled to said drive mechanism for producing a simulation of the position of said element, first signal means operatively connected to measure the position of said simulation and produce a first control signal proportional to said simulation position, second signal means operatively connected to measure the relative position of said simulation and said element position and to produce a second control signal proportional to said relative position, and a signal combiner device operative to combine said first and second control signals and to produce thereby a third control signal proportional to the position of said machine element, said simulator device having a rotatable shaft with first and second control signals being in the form of phase angle displacements of a standard signal and representative of the rotational position of said shaft, said first signal means including a resolver device coupled to the shaft of the simulator device, said simulator device being operative to convert the rotation of said shaft into said simulation position, said resolver device producing an alternating current signal with phase displacement proportional to the rotation of said shaft, and a servo loop for converting said second control signal into a rotational shaft position which is supplied to a resolver combiner device for adding said rotational shaft position to said alternating current signal in terms of an additional phase displacement.

6. In machine control apparatus for a machine element to be positionally controlled, the combination of a drive mechanism coupled to said machine element to position said element, a simulator device coupled to said drive mechanism for producing a simulation of the position of said element, first signal means operatively connected to measure the position of said simulation and produce a first control signal proportional to said simulation position, second signal means operatively connected to measure the relative position of said simulation and said element position and to produce a second control signal proportional to said relative position, and a signal combiner device operative to combine said first and second control signals and to produce thereby a third control signal proportional to the position of said machine element with the coupling between said drive mechanism and said machine element including a transverse feed screw.

7. In machine control apparatus for a machine element to be positionally controlled, the combination of a drive mechanism coupled to said machine element to position said element, a simulator device coupled to said drive mechanism for producing a simulation of the position of said element, first signal means operatively connected to measure the position of said simulation and produce a first control signal proportional to said simulation position, second signal means operatively connected to measure the relative position of said simulation and said element position and to produce a second control signal proportional to said relative position, and a signal combiner device operative to combine said first and second control signals and to produce thereby a third control signal proportional to the position of said machine element with the coupling between said drive mechanism and said machine element including a transverse feed screw and with said simulator device including a precision threaded screw having substantially the same pitch as said transverse feed screw and having a precision fitted nut on said threaded screw.

8. In machine control apparatus for a machine element to be positionally controlled, the combination of a drive mechanism coupled to said machine element to position said element, a simulator device coupled to said drive mechanism for producing a simulation of the position of said element, a first signal means operatively connected to measure the position of said simulation and produce a first control signal proportional to said simulation position, second signal means operatively connected to measure the relative position of said simulation and said element position and to produce a second control signal proportional to said relative position, and a signal combiner device operative to combine said first and second control signals and to produce thereby a third control signal proportional to the position of said machine element with the coupling between said drive mechanism and said machine element including a transverse feed screw and with said simulator device including a precision threaded screw having substantially the same pitch as said transverse feed screw and having a precision fitted nut on said threaded screw, said second signal means for measuring the relative position of said simulation and said machine element including a differential transformer device coupled to said machine element and to said nut.

No references cited.